United States Patent [19]

Hood

[11] 4,001,446

[45] Jan. 4, 1977

[54] COLOR STABILIZED PRODUCT AND PROCESS

[75] Inventor: Larry Lee Hood, Crystal Lake, Ill.

[73] Assignee: The Quaker Oats Company, Chicago, Ill.

[22] Filed: Oct. 28, 1975

[21] Appl. No.: 626,285

[52] U.S. Cl. .............................. 426/250; 426/263; 426/265; 426/540; 426/647; 426/657; 426/805; 426/264

[51] Int. Cl.$^2$ ................... A23L 1/27; A22C 11/00; A23K 1/04; A23K 1/10

[58] Field of Search .......... 426/263, 264, 265, 250, 426/268, 647, 657, 546, 805, 474

[56] References Cited

UNITED STATES PATENTS

| 2,831,774 | 4/1958 | Furgal | 426/264 |
|---|---|---|---|
| 2,863,777 | 12/1958 | Dekker | 426/265 |
| 3,122,748 | 2/1964 | Beebe | 426/263 |
| 3,361,577 | 1/1968 | Simon et al. | 426/265 |
| 3,459,117 | 8/1969 | Koch et al. | 426/265 |

FOREIGN PATENTS OR APPLICATIONS

| 1,294,415 | 10/1972 | United Kingdom | 426/540 |

*Primary Examiner*—Jeanette M. Hunter
*Attorney, Agent, or Firm*—Mathew R. P. Perrone, Jr.

[57] ABSTRACT

Formulating a retart stable, red color in an animal protein source by slurrying the protein, adding a reducing agent, reacting with carbon monoxide and recovering the stabilized red color. The stabilized color is used in moist pet food.

21 Claims, No Drawings

COLOR STABILIZED PRODUCT AND PROCESS

BACKGROUND OF THE INVENTION

This invention relates to a food product and more particularly to a food product containing color stabilized animal protein.

Within the class of pet foods, there are three general subdivisions — dry pet food, moist pet food, and semi-moist pet food. Dry pet food tends to be the most stable pet food with the least sophisticated packaging required to maintain that stability. Customarily, dry pet food is not as palatable as the other types of pet food. Semi-moist pet food is a relatively stable pet food requiring somewhat more stringent packaging conditions than dry pet food, but with a corresponding increase in palatability. Moist pet food is the most palatable of the three classes of pet food, but requires the most stringent packaging conditions. However, moist pet food is still the most acceptable to pet owners and pets.

It is generally accepted that a pet food must please the owner of the pet, and the pet. The owner is pleased by a pet food which has an appearance close to that of meat. The pet is pleased by a pet food which has an acceptable taste. Inherent in a meat-like appearance, is a red coloration. One means of achieving a red coloration in a pet food containing meat, or blood is the use of a salt such as sodium nitrite. When present in an aqueous environment, the nitrite ion is in equilibrium with nitrous acid and nitric oxide. The nitric oxide potentially reacts with either the meat protein, myoglobin, or the blood protein, hemoglobin. The specific locus of the combination between such proteins and nitric oxide is believed to be the iron molecule which is permanently present as a reactive site normally reserved for the binding of oxygen. The above proteins carry out the physiological purpose of oxygen transfer to the body. When the binding between the nitric oxide and the protein occurs in combination with heat sufficient to denature or precipitate the protein, a heat stable and acetone extractable red pigment is established. This pigment accounts for the acceptable color in many pet foods. The basic problem with the use of the nitrite to achieve the desired color is the fact that it has undesirable characteristics when consumed. These undesirable characteristics render it necessary to find a replacement for the nitrite ion which will achieve the desired color results without having an adverse effect on the pet food.

Prior attempts to flush the pet food product with carbon monoxide to achieve the desired red color are not successful. The color is neither as bright as desired nor as stable as desired for use in the moist pet food. Also the packaging conditions used to preserve a moist pet food have an adverse affect on a number of materials. A material must be very stable to withstand the rigorous packaging conditions. This lack of stability present when a food is merely flushed with carbon monoxide does not permit the red coloring or other desired coloring produced thereby to remain stable under the packaging conditions for a moist pet food.

Another basic problem with stabilizing the above-referenced proteins is that the complex formed is more stable when the iron in the protein is in the (Fe II) state. However, it is difficult to maintain that state. The (Fe III) state is more stable. Therefore, the iron content tends to oxidize to the (Fe III) state before the stabilization effect takes place. It is, therefore, desirable to stabilize the above-referenced proteins while maintaining the iron content thereof in the (Fe II) state. By "(Fe II)" is meant $Fe^{+2}$ (ferrous ion). By "(Fe III)" is meant $Fe^{+3}$ (ferric ion).

Protein stabilization remains a problem in the art — especially for proteins used in moist pet foods.

THE INVENTION

Therefore, it is an object of this invention to provide an improved pet food having a color acceptable to the pet owner.

It is a further object of this invention to provide a stabilized red coloring for use in a pet food.

It is a still further object of this invention to provide a replacement for the nitrite stabilized coloring.

Also, an object of this invention is to provide a process for color stabilizing a pet food.

Another object of this invention is to provide a process which color stabilizes a pet food without the use of the nitrite ion.

These and other objects of this invention are met by providing a process for reacting an animal protein source with carbon monoxide to form a color stabilized product in incorporating the color stabilized product in a moist pet food.

DESCRIPTION OF THE PREFERRED EMBODIMENTS

A dispersion of an animal protein source is treated with carbon monoxide to stabilize the color thereof. The resulting product is incorporated into a pet food resulting in a color stabilized pet food.

Several important variables determine the amount of color stabilization in pet foods formed by the process of this invention. The color stabilization is achieved for the purposes of this invention by treating blood or meat with carbon monoxide. The variables which affect the color obtained include (1) the extent of saturation of potential carbon monoxide bonding sites, (2) the oxidation state of the iron in the protein of the meat or blood, (3) the final concentration of blood or meat protein in the total pet food formulation, and (4) the type of heat (dry or moist) and its application process which stabilizes the color of the carbon monoxide treated material.

The more thoroughly or completely saturated protein source has a color much brighter red than the less saturated protein source. Bonding between the iron and the carbon monoxide is more efficient if the iron is in the (Fe II) state. Within the total pet food formulation the color is affected by the concentration of the treated and untreated blood or meat protein in the pet food. As moistness of the meat increases, the reaction of the carbon monoxide with the protein increases, and becomes more complete.

In the preferred process of this invention, an aqueous suspension or dispersion or slurry containing appropriate proteins is treated with carbon monoxide to form a bright red, heat stable color. Basically, the protein is an animal protein. The protein is blood or meat, or mixtures thereof. By blood is meant the blood remaining and drained from a slaughtered animal. By meat is meant the flesh of cattle, swine, sheep, goats, horses, whale, and other mammals, in addition to poultry and fish. Also suitable as a meat component of this invention is a meat by-product. By meat by-product is meant those items shown in the 1975 Association of American Feed Control Officials, Inc. under No. 9 Animal Products, 9.2 page 70 which says meat by-products are the non-rendered, clean, wholesome parts other than meat derived from slaughtered animals. Meat by-products include but are not limited to lungs, spleen, kidneys, brains, livers, blood, bone, and partially-defatted, low temperature, fatty tissue; and stomachs and intestines freed of their contents. If it bears a name description of its kind, it must correspond thereto (Proposal 1973, Adopted 1974, NCR5-00-395).

Meat or meat by-products may be used in the invention in any reasonable size particle. In fact, chunks formed by merely cutting the meat or meat by-products are suitable for use in this process. However, if the meat or meat by-products are ground to a point where they are fine enough to be suspended in an aqueous slurry, the reaction is more efficient and is carried out to a greater extent. For example, the meat may be ground to a size of ½ inch particles. More specifically, the meat may be ground to a size of up to about ¼ inch particle. Most specifically the meat or meat by-products may be ground to a size of up to ⅛ inch particle.

The slurry is formed in any suitable fashion. Blood which has a substantial amount of liquid already present therein requires less water to form the slurry than does meat or meat by-products. Generally speaking the slurry may have up to about 20 percent by weight solids content. More specifically, the slurry may have up to about 15 percent by weight solids content. Most specifically, up to about 10 percent by weight solids content is suitable for the slurry. These figures are easily adjusted by a person having ordinary skill in the art to achieve the desired slurrying factors.

The slurry is then contacted with carbon monoxide. The contact with carbon monoxide is continued until at least 10 percent of the possible carbon monoxide reaction points are saturated. More preferably, the saturation with carbon monoxide ranges at least about 50 percent. Most preferably the saturation with carbon monoxide ranges at least about 75 percent. The theoretical aspects of saturation are not usually completely achieved. Practically the maximum saturation is obtained at about 80 percent of the theoretical. However, up to and including 100 percent saturation is also possible. The cited saturation points percentages are all based on the theoretical percentage.

The saturation percentage is adjustable to achieve a desired color. Optionally however, the blood can be thoroughly and completely saturated, that is, up to the maximum theoretical standpoint. Color is then adjustable by using untreated material to adjust the color downward or make it less dark. Other adjustments in the color of the treated blood are made by adding colors such as iron oxide, generally having the formula of $Fe_3O_4$. Also FD&C food color such as Brown, Orange, or Red may be used to adjust the color. Mixtures of materials may also be used for color adjustments. These color adjustments can be used individually or in any reasonable combination. For example, both the food coloring and the untreated blood may be mixed to achieve the desired functionality or color. In this fashion there are a variety of means of achieving the desired color. Incorporation of the iron oxide or other materials is up to about 1 percent by weight of the protein source. More preferably about 0.1 percent of the protein source comprises the coloring.

The slurry thus formed with the protein source and the various dyes is treated in any reasonable temperature. Customarily more efficient gas reaction with the carbon monoxide is achieved at either room temperature or slightly below. It is feasible to heat or cool the slurry for the reaction. However, at the present time the process economics of heating or cooling do not compensate therefor. The effective way of determining the amount of saturation is to observe the color of the product. This color is determined either visually or by comparison of a standard scale such as that disclosed on the Agtron scale, the Colormaster (Adams) scale or the Munsell color chart. The stabilized blood or protein generally has an Agtron rating of at least 20 percent. The "L" rating for stabilized blood or protein of this invention on the Colormaster about 25 or higher; the "a" rating 55 or higher; and the "b" rating is generally insignificant due to it being a yellowness measurement. Improved red for the stabilized protein is also shown on the Munsell color scale.

It is also feasible to measure the flow rate to determine the amount of gas carbon monoxide used in the reaction. Standard simple calculations are used to determine the amount of carbon monoxide necessary. When a completely saturated protein source is used, the carbon monoxide may be used in excess to assure the complete reaction. Again the standard calculations are permitted to determine exactly what source and amount of carbon monoxide are usable. For example, typical methods for determining carbon monoxide concentration include the Van Sylke manometric determination which is standard clinical chemistry method, or the Conway micro diffusion cell method using palladium chloride with a back titration of the liberated hydrochloric acid. Other known methods are also suitable for this purpose.

The most effective way of binding carbon monoxide to the protein source is to have the iron content of the protein be in the (Fe II) state. Frequently, however, the iron in the protein oxidizes to the (Fe III) state. In this state, binding of the carbon monoxide is not efficient and a proper red color is not achieved. In order to avoid the oxidation to the (Fe III) state, two options are possible. For the first option, the protein source may be used quickly enough to prevent such oxidation. For a second option, an edible reducing agent is incorporated into the protein to reduce most of the iron to the (Fe II) state. Typical edible reducing substances may be used singly or in combination. Satisfactory examples of edible reducing substances include ascorbic acid and salts thereof, sulfur dioxide, or sodium sulfite. Other suitable edible reducing substances include erythorbic acids and salts thereof. A suitable salt is sodium erythorbate or sodium ascorbate. Generally speaking, these reducing agents are used in an amount up to about 2 percent by weight of the protein source. More preferably, the amount of the reducing agent is up to about 1 percent. Most preferably, the amount of reducing agent is up to about 0.2 percent. The use of these reducing agents permits the storage of the protein source until use as desired.

Besides reducing the iron in the protein source to the (Fe II) state, further process limitations assist the completion of the reaction. Preferably, the content of the carbon monoxide is increased by agitating the aqueous suspension while contact is made between the suspension and the carbon monoxide. The most efficient combination of the carbon monoxide and the protein occurs when the reaction takes place in a sealable (gas tight) vessel. The carbon monoxide is admitted to purge the vessel of air. Then, the vessel is sealed and agitated with a shaking or oscillatory motion or slow rolling action. Severity and length of agitation greatly effect the saturation of carbon monoxide obtained. These variables are manipulatable to obtain various shades of red in the product. Generally speaking, reaction times range from about 0.5 to about 80 minutes. More preferably, the reaction time is from about 1 to 60 minutes. Most preferably, the reaction time ranges from about 5 to 34 minutes.

Generally reaction efficiency between the protein source and carbon monoxide is achieved upon agitation of the protein source. Agitation can be done in any suitable fashion such as by agitation, or shaking as exemplified by a wrist shaker, or other manipulation of the protein source. Suitable agitation produced by rotation of the reacting vessel ranges from about 5 to about 45 rpm. More preferably, the rotation agitation ranges go from about 20 to 25. Most preferably, the suitable shaking agitation range goes from about 170–190 cycles per minute.

Furthermore, color change can occur when the product is being used in a pet food. It is possible to vary the final shade of red from bright red to one of more brown character by heating the product to temperatures of about 70°–85° C. in an open vessel prior to sealing the pet food for sterilization. Such heat induced color loss is less drastic if the protein is treated with reducing agent or if the heating is conducted in a closed container, to thereby provide moist heat conditions. The brightest and apparently maximum color obtained by the process described herein results when blood or meat by-product or meat is properly saturated with carbon monoxide, mixed with the other formulation ingredients, and sealed in a can at a temperature near or slightly above room temperature (about 25° C. to about 65° C). Subsequent sterilization results in a pet food which has a red color greater than or nearly equal to that derived from the nitrate treatment. The color stabilized meat or blood is incorporated into a moist pet food.

The treated proteins formed by this invention are highly stable. The color is not apparently extractable with acetone as is the case with the nitrite hemoglobin complex. Stability of the carbon monoxide complex with the hemoglobin or myoglobin is further indicated by only slight solubilization in ammonium hydroxide. This reaction of the carbon monoxide has the further effect of stabilizing and having no adverse effect on the protein. The lack of the adverse effect on the protein is indicated by the fact that the gel electrophoresis patterns are not altered by the carbon monoxide treatment of the protein.

If it is not desired to use the carbon monoxide treated protein immediately, frozen storage has been found to provide the most stable means of retaining the product for future use. Refrigeration storage is acceptable but use must be made more quickly in order to avoid the microbiol deterioration.

Furthermore, it has been found that the reaction is better carried out in darkness. While it is not desired to be bound to any particular theory, it is assumed that the light caused photo dissociation of the hemoglobin carbon monoxide complex. Running the reaction in darkness, permits a use of increased efficiency for the process.

The process is customarily carried out by charging a reactor and inserting the necessary gas and other materials as above stated. However, this process may be easily modified to determine the excess of the carbon monoxide required and to make the process a continuous process.

Typically, the moist pet food contains about 15 percent to about 50 percent by weight of the pet food of the above-described animal protein sources. To achieve the desired red color only part of the animal protein sources need to be included in the process wherein the carbon monoxide is added. Another optional component of the canned pet food is about 10 percent to about 20 percent by weight vegetable products. The balance of the pet food consists of flavoring, nutrition materials and other desired additives. The water which is added renders the pet food suitable for processing. The basic product of the carbon monoxide treated blood or meat is the component added to this moist pet food to achieve the desired red, meat-like color.

While it is not desired to be bound by any particular theory, the following postulate is offered as an explanation for the effectiveness of the carbon monoxide combination. Carbon monoxide while taken into the lungs during breathing is absorbed in the blood and can mimic oxygen in its ability to bind it to the protein called hemoglobin. The complex resulting therefrom is also effective with the myoglobin or meat. This complex mimics the interaction of the proteins and nitric oxide above-described. The red color results from a complex physical chemical interaction between the iron bound carbon monoxide, heat denatured protein, and associated water. The speed of binding and the time required for obtaining a given saturation level for carbon monoxide is a function of how rapidly the carbon monoxide is dissolved in the medium containing the proteins.

This theory and the process of this invention is especially applicable to whole blood. The blood may be fresh or frozen, citrated, preserved with anticoagulants or otherwise treated prior to use in this process. It is neither required nor desirable to separate the hemoglobin and work with the hemoglobin alone. Use of whole blood simplifies the process and does not sacrifice nutrition available from the leftover material after hemoglobin removal is accomplished.

Having thus fully described the invention, the following examples are presented to more clearly illustrate the invention without unduly limiting the invention. All parts and percentages cited in the examples and elsewhere in the specification are by weight unless otherwise disclosed.

EXAMPLE 1

Fresh beef blood, previously citrated to delay clot formation, is placed in a sealable container having a volume 8–10 times greater than the liquid volume. The blood itself contains about 80 percent water and requires no additional moisture to make a suspension. The container is rendered gas tight by a closure fitted with 2 gas valves, one suitable for admission of gases, the other for exit of air and reaction gas. The container, now referred to as a reaction vessel is purged with a volume of carbon monoxide equal to 4 times the vacant space of the reaction vessel. The vessel is completely sealed, having ensured that the vacant space above the blood is totally occupied with carbon monoxide and the vessel agitated at 180 cycles per minute. Such agitation constantly coats the reaction vessel walls with a thin film of blood and thereby guarantees complete reaction of CO with the hemoglobin binding sites after 30 minutes. The saturated blood (80–100 percent theoretical) is transferred to a sealable container capable of withstanding a thermal process of 120° C. for 1 hour. Longer cooking times may be used if necessary and render the product bacteriologically stable. Upon cooling the cooked blood is bright red in color. Samples of treated and cooked blood can be held indefinitely if sterile. When cooked blood is opened, it is as bright as recently processed blood.

Color measurements are made on two instruments — the Agtron M-500-A and the Colormaster Model V. The Agtron lacks sensitivity except in the Red filter mode; the red reflectances in percent are given below. The Colormaster readings are converted to the Modified Adams L, a, b Coordinates by the tables of Glasser and Troy (*Journal of the American Optical Society* 42, 652 [1952]). Finally, the samples are matched against Munsell color chips.

Table 1

| SAMPLE | AGTRON RED (%) | COLORMASTER (ADAMS) L | a | b | MUNSELL |
|---|---|---|---|---|---|
| Control | 16 | 21.8 | 31.1 | 13.1 | 10.0R 3/4 |
| Stabilized | 22 | 27.5 | 60.5 | 11.8 | 5.0R 4/10 |
| Dog Food (Ex 10) | 40 | 45.1 | 104.2 | 12.9 | 5.0R 5/8 |

All three systems show greatly increased redness for the stabilized vs. control sample, with the L, a, b system (as intended by its originator) giving the best agreement with visual judgement of differences.

EXAMPLE 2

Frozen and citrated beef blood is used in the procedure set forth is Example 1. The cooked blood is as bright as fresh blood.

EXAMPLE 3

Frozen citrated or fresh citrated blood previously stored for 1 week in a refrigerator is suspended as an aqueous solution. The solution is divided into two parts. Into one solution, ascorbic acid is added. The amount of ascorbic acid is 0.5 percent by weight of the beef blood. The procedure of agitation set forth in Example 1 is repeated for both samples. The sample containing the ascorbic acid achieves a redder color. The sample without the ascorbic acid is stabilized, but is less red than the sample including the ascorbic acid. Heating temperature for the blood is 110° C. as in Example 1.

EXAMPLE 4

Beef lungs are ground through a ⅛ inch plate and mixed with water (1 part lungs : 8.4 parts water) to form a slurry which is placed into the reaction vessel as in Example 1. The procedure of Example 1 is followed. The red color is achieved.

EXAMPLE 5

The procedure of Example 1 is carried out in an opened vessel. The resultant product is stable but not as red as Example 1 which is carried out in a closed vessel.

EXAMPLE 6

A slurry consisting of 25–30 percent solids (meat by-products, chicken parts, blood and water) is treated with carbon monoxide as in Example 1. The treated ingredients are incorporated into a moist pet food which is heated in an open vessel to 185° F. with adequate mixing to ensure uniform heating. The moist pet food is sealed in cans and sterilized. A suitable product is obtained.

EXAMPLE 7

A slurry is prepared as in Example 6, but also contains 0.2 percent ascorbic acid. The procedure of Example 5 is followed. The product is brighter red than the product of Example 5.

EXAMPLE 8

Blood saturated with carbon monoxide is prepared as in Example 1. The treated blood may be mixed with various amounts of untreated blood and the mixture cooked in a closed container. Using this procedure, one may obtain any shade of red color desired, from bright red to the dark brown associated with untreated, cooked blood.

EXAMPLE 9

Blood is treated as in Example 1. The treated blood may be mixed with iron oxide (0.1 – 1.0 percent of protein) to produce various shades of red which present a deeper, richer color tone not obtainable with carbon monoxide treatment alone.

EXAMPLE 10

The ingredients listed in the table are collected in two equal weight groups, each group having the weight listed.

Table 2

| Ingredients | Grams |
|---|---|
| Bone Meal | 136.2 |
| Pork Lungs | 61.29 |
| Spleen | 47.67 |
| Gullets | 47.67 |
| Pork Skins | 47.67 |
| Blood | 34.05 |
| Soy Grits | 122.58 |
| Oat Groats | 36.32 |
| Steel Cut Barley | 36.32 |
| Cracked Milo | 26.01 |
| $I_2$ Salt | 10.90 |
| Onion Powder | 0.64 |
| Garlic Powder | 0.16 |
| Vitamin Mix | 0.68 |
| Mineral Mix | 0.54 |
| Sodium Nitrite | 0.05 |

Group 1 is left as a control. In Group 2, the sodium nitrite is eliminated and the chicken parts, pork lungs, spleens, gullets, and blood are mixed and reacted with carbon monoxide in the manner of Example 1 for 30 minutes at room temperature. Group 1 and Group 2 are individually formulated into a standard moist pet food. The pet food from Group 2 has a salmon pink color which is superior to the color of the Group 1 pet food. Group 1 uses 684.95 grams of water. Group 2 uses 513.71 grams of water to form the slurry for the Example 1 treatment. Then sufficient water to equal the water of Group 1 is added. The color rating of Group 2 is shown in Table 1.

Having thus fully described and disclosed the invention, what is claimed and desired to be secured by Letters Patent of the United States is:

1. A process for forming a stabilized red color in an animal protein source containing iron comprising:
   A. obtaining at least one animal protein source selected from the group consisting of meat, blood, and a meat by-product;
   B. forming a slurry, dispersion, or suspension of the protein source;
   C. adding at least one edible reducing agent to the protein source wherein the reducing agent comprises up to 2% by weight of the protein source, and whereby the iron content of the protein source is maintained in the ferrous state;
   D. agitating the slurry dispersion, or suspension of the protein source;
   E. reacting the protein source with carbon monoxide sufficiently to achieve at least 10% saturation to form a retort- and color-stabilized protein source; and
   F. recovering the retort- and color-stabilized protein source.

2. The process of claim 1 wherein the reducing agent is at least one selected from the group consisting of erythorbic acid, sodium erythorbate, sodium ascorbate, ascorbic acid, sulfur dioxide, and sodium sulfite.

3. The process of claim 2 wherein the protein source is blood.

4. The process of claim 2 wherein the reacting is conducted in a closed container to thereby provide darkness for the reaction.

5. The process of claim 4 wherein the carbon monoxide saturation is at least 50 percent of theoretical.

6. The process of claim 5 wherein the reacting time is about 0.5 to about 80 minutes.

7. The process of claim 6 wherein the agitation is by shaking at about 170–190 cycles per minute for about 1 minute to about 60 minutes.

8. The process of claim 7 further comprising:
   A. incorporating the stabilized protein in a moist pet food; and
   B. heating the pet food to adjust the color within the red to pink to brown range at about 70° to 85° C. in an open vessel.

9. The process of claim 6 wherein the agitation is by rotating at about 5 to about 45 revolutions per minute for about 1 minute to 60 minutes.

10. The process of claim 1 wherein the slurry contains up to 20% solids by weight of the slurry.

11. The process of claim 10 wherein the slurry contains up to 10% solids by weight of the slurry.

12. The process of claim 1 wherein the carbon monoxide saturation is at least about 50 percent.

13. The process of claim 1 wherein the protein source is completely and thoroughly saturated with carbon monoxide, and the color of the protein source is adjusted by adding thereto at least one component selected from the group consisting of food color and a second protein source wherein the second protein source is untreated with carbon monoxide.

14. A process for forming a stabilized red color in an animal protein source containing iron comprising:
   A. obtaining at least one animal protein source selected from the group consisting of meat, blood, and a meat by-product;
   B. forming a dispersion, suspension, or slurry of the protein source;
   C. agitating the dispersion, suspension or slurry of the protein source; and
   D. reacting the dispersion, suspension or slurry of the protein source with carbon monoxide sufficient to saturate the protein source with the carbon monoxide to at least 10 % of theoretical.

15. In a moist pet food comprising at least one protein source selected from the group consisting of a meat by-product, meat, and blood, the improvement wherein the pet food further comprises a reaction product of at least part of the protein source and carbon monoxide whereby the reaction product is retort- and color-stabilized.

16. The pet food of claim 15 wherein at least one protein source is meat.

17. The pet food of claim 15 wherein at least one protein source is blood.

18. A stabilized protein source having a stabilized color comprising the reaction product of carbon monoxide and the protein source wherein the protein source is at least 50 percent saturated with carbon monoxide, is fine enough to be formed into a slurry, dispersion, or suspension and is selected from the group consisting of meat, a meat by-product, and blood.

19. The stabilized protein source of claim 18 wherein the protein source is blood.

20. The stabilized protein source of claim 18 wherein the protein source is at least 80 percent saturated with carbon monoxide.

21. The protein source of claim 18 wherein the meat or meat by-product is ground to a particle size of up to ½ inch.

* * * * *